United States Patent Office 3,461,109
Patented Aug. 12, 1969

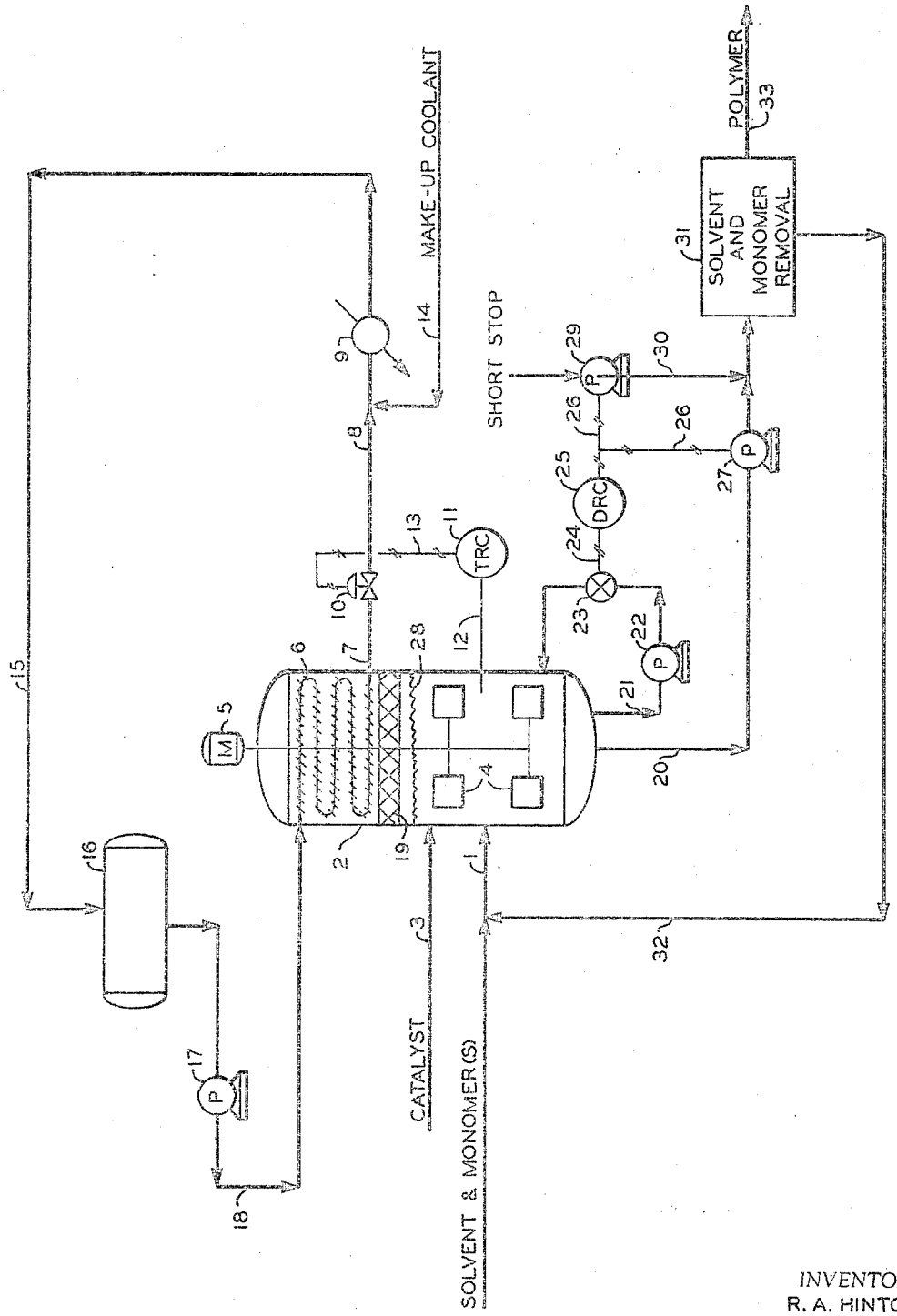

3,461,109
PROCESS FOR THE POLYMERIZATION OF CONJUGATED DIENES
Robert A. Hinton and Donald D. Norwood, Bartlesville, Okla., assignors to Phillips Petroleum Company, a corporation of Delaware
Filed Nov. 9, 1964, Ser. No. 409,758
Int. Cl. C08d 1/04, 1/32; C08f 1/08
U.S. Cl. 260—83.7                                    8 Claims

ABSTRACT OF THE DISCLOSURE

Polymerization reaction carried out in a reaction zone and vapors formed therein are condensed and returned to the reaction medium without removal of the vapors from the reaction zone.

---

This invention relates to a method and apparatus for polymerizing a monomer or monomers.

Heretofore in the production of polymers by solution processes a general concentration limit of 10 weight percent or less polymer could be produced in a single reactor because when on the order of 10 weight percent of polymer is produced, the mixture of polymer, monomer, solvent and catalyst becomes so viscous that transfer of the heat of the exothermic polymerization reaction from the reactor is rendered extermely difficult and therefore maintenance of the reactor at a desired constant reaction temperature is also rendered extremely difficult.

Also heretofore, since solutions of no more than 10 weight percent polymer could be efficiently produced in a single reactor it was necessary to concentrate the reactor effluent by flashing same to remove a certain amount of solvent and residual monomer prior to treating the batch to conventional solvent and monomer removal operations such as steam stripping.

Quite unexpectedly, it has been found that monomer or monomers, hereinafter referred to simply as monomer, can be solution polymerized to polymer concentrations of from 15 to 25 weight percent by utilizing a reactor which contains a heat transfer surface in the upper portion thereof and by maintaining a substantially liquid mixture of monomer, solvent and catalyst in the lower portion of the reactor below the heat transfer surface and under polymerization conditions which produce vapors of the solvent or monomer or both. Also, during the polymerization reaction the mixture is continuously agitated and the vapors of the solvent, etc. are continuously condensed by contact with the heat transfer surface, the rate of heat removal by this surface being controlled in response to the difference between the temperature in the reactor in the area of the mixture and a desired reaction temperature so that the temperature in the reactor after warm-up is maintained at a desired value by removal of the polymerization heat of reaction through the condensation of the vapors on the heat transfer surface. The condensed vapors are allowed to continuously and freely return directly to the mixture in the lower portion of the reactor.

After the reaction takes place, the mixture of polymer, solvent, monomer and catalyst is removed from the reactor and passes directly to conventional solvent and monomer removal operations wherein the monomer and solvent are removed from the polymer and returned to the polymerization system for reuse in the reactor and the polymer is recovered as a product of the process.

It can be seen that, by the method and apparatus of this invention, a solution polymerization reaction can be carried out to a quite high polymer concentration thereby allowing for greater productivity from a single reactor per unit of material processed and eliminating the necessity of an expensive flash concentration operation on the reactor effluent prior to conventional solvent and monomer removal operations such as steam stripping.

It can also be seen that by this invention, and particularly by the provision of the internal condensing feature, the solvent-to-monomer ratio which is an important polymerization operating condition, can be maintained at a uniform value relative to the ratio in the original feedstock and the degree of polymerization accomplished and that this value can be ascertained at any given time during the reaction. This is to be distinguished from prior solution polymerization reactors which utilize external condensing and cooling means, which means separate, from the reaction mixture, a significant amount of solvent and/or monomer and thereby alter the solvent-to-monomer ratio in the reacting liquid phase during polymerization. Also, the internal condensing feature of this invention provides the additional advantage that the condensate which is returned to the reaction mixture has substantially the same solvent-to-monomer ratio as the mixture itself. This also distinguishes from prior solution polymerization reactors which utilize external condensers in which the returned condensate generally has solvent-to-monomer ratios substantially different from that of the reaction mixture to which it is being returned.

Finally, it can be seen that since a high polymer concentration in the reactor can be achieved by this invention, significantly lower solvent-to-monomer ratios than heretofore possible can be employed in this invention.

Accordingly, it is an object of this invention to provide a more economical and simplified method of polymerizing a monomer. It is another object of this invention to provide a more economical and simplified apparatus for producing polymers.

Other aspects, objects and the several advantages of the invention will be apparent to those skilled in the art from the disclosure, the drawing and the appended claims.

The drawing illustrates diagrammatically a system embodying this invention.

In the drawing, solvent and monomer which can be in a desired weight ratio in the range of from 2:1 to 15:1, preferably 3:1 to 10:1, still more preferably 5:1, is passed by 1 into reactor 2. Catalyst is added to reactor 2 by 3 and a mixture of solvent, monomer and catalyst is formed by turbine impellers 4, 4 which are rotated by motor 5. In an upper portion of reactor 2 there is positioned a heat transfer surface 6 which can be of any known construction and configuration such as helical, finned tubing. Coolant, passing through heat transfer coil 6 which contacts vapors of monomer or solvent or both generated by the heat of reaction, condenses the vapors and thereby removes the heat liberated by the solution polymerization reaction and removes same from reactor 2 by passing out of the reactor through 7 and 8 to condenser 9. The flow of coolant through coil 6, and therefore the temperature of reactor 2, is controlled by motor valve 10. Temperature recorder controller 11 is operatively connected by measuring element 12 to reactor 2 and thereby senses the temperature in reactor 2. Within conventional temperature controller 11, a control signal is produced in signal path 13 which is related to the difference between the actual measured reaction temperature and a manually adjustable desired value thereof. The signal is applied to valve 10 to operate same. For example, in response to a temperature excursion above that temperature which has been determined to be the desired maximum temperature for the reaction and reactor 2, motor valve 10 is opened by a signal from 11 to a greater degree in order to allow more coolant to flow through coil 6 and therefore carry away more heat of reaction. Similarly, a temperature below the desired value acts to decrease coolant flow. Make-up coolant as necessary is added by 14 and the condensed and cooled liquid from 9 is passed by 15 to accumulator 16 and then by pump 17 and line 18 through coil 6. The coolant employed herein can be water, an organic liquid such as hexane or other known material which can be maintained at temperature and pressure conditions which keep the coolant in liquid phase in coil 6. Of course, the coolant can undergo partial vaporization within coil 6 if desired.

Although not required it can be desirable to insert an entrainment separator 19 between the heat transfer surface and the surface of the reaction mixture of polymer, monomer, solvent and catalyst 28 in order to prevent that boiling mixture from contacting the heat transfer surface and coating same with polymer and other materials thereby impairing the heat transfer capabilities of the heat transfer surface. Entrainment separators for collecting and separting liquid droplets from a gas stream in which they are entrained are known in the art and can consist of one or a series of mats usually consisting of fibers, woven or braided metal, glass or resin wires or strands. The mats separate the entrained liquid from the gas and the separated liquid, i.e. polymer solution, drains and is thereby prevented from contacting and coating the heat transfer surface in the upper portion of the reactor.

After carrying out the solution polymerization reaction to the desired extent, the reaction mixture is removed from reactor 2 by 20. The extent to which the reaction has been carried is determined by continuously or intermittently removing a part of the reaction mixture and passing same through closed loop conduit 21 by pump 22. In loop 21 there is situated a density transmitter 23 which measures reaction mixture density and supplies this value by 24 to density recorder controller 25 in which the density of the material passing through loop 21 is compared with a value of desired reactor effluent density. When operated in the preferred batch manner, at the time that the density reaches a sufficiently elevated magnitude, thereby indicating a certain degree of conversion of monomer to polymer, a signal is transmitted by 26 which starts pump 27 so as to remove reaction mixture from reactor 2 by 20. Density recorder controller 25 also operates, preferably after a time interval, pump 29 which injects by 30 reaction-terminating material (shortstop) into 20 to be mixed with the reaction effluent and stop the polymerization reaction. The reaction mixture and short stop then passes to conventional polymer precipitation and solvent and monomer removal operation 31. The removed solvent and monomer is passed by 32 to 1 for use as recycle feed to reactor 2. The polymer product of the invention is removed by 33 for further treatment, storage, marketing and the like.

While batch operation is presently preferred with known catalyst systems to produce presently desired polymers, this invention can also be employed to conduct continuous-flow polymerizations with appropriate modifications of the feeding and product removal systems so as to accommodate continuous stream flow. At present, however, it is preferred to employ this invention in a batch operation but it is to be understood that this is not an exclusive mode of practicing the invention.

It should also be understood that this invention can be practiced with the use of a heat exchanger external to the reactor with direct and immediate recycle of condensate to the reactor. However, it is now preferred to practice this invention utilizing a heat transfer surface internal to the reactor.

Generally, one or more polyolefin monomers can be utilized as feed material for this invention. However, preferred monomers are dienes, still more preferably conjugated dienes, having from 4 to 6 carbon atoms per molecule which includes such dienes as butadiene, isoprene, piperylene, 2,3-dimethyl-1,3-butadiene, 2-methyl-1,3-pentadiene and the like. Other applicable monomers are listed in application Ser. No. 45,042, filed July 25, 1960, now U.S. Patent 3,099,648.

There can also be employed in the practice of this invention 1-olefins polymerizable with the above-mentioned dienes. Such olefins include ethylene, propylene, 1-butene, 1-hexene, isobutylene, styrene, methylstyrene, and the like. Other olefins are listed in application Ser. No. 45,402, filed July 25, 1960, now U.S. Patent 3,099,648.

The catalyst system which can be employed in polymerizing the monomers and monomers with 1-olefins or mixtures of 1-olefins can be one of several known systems which will be obvious to those skilled in the art. Examples of such catalysts are two component systems where one component is an organometal or a metal hydride and the other component is a Group IV to VI and VIII (Mendeleef's Periodic System) metal compound such as a salt or alcoholate. A full and complete disclosure of these catalysts can be found in U.S. 3,095,406 issued to Short et al. on June 25, 1963. Still other catalysts are fully disclosed in U.S. 2,846,427 issued to Findlay on August 5, 1958. Preferred are the lithium-containing catalysts or initiators. These catalysts have the formula $RLi_x$, wherein R is a hydrocarbon radical selected from the group consisting of aliphatic, cycloaliphatic and aromatic radicals and $x$ is an integer from 1 to 4, inclusive. The R in the formula has a valence equal to the integer and preferably contains from 1 to 20, inclusive, carbon atoms, although higher molecular weight compounds can be utilized. In preparing a polybutadiene, it is often preferred to use an alkyllithium compound, such as n-butyllithium, as the catalyst. Examples of other suitable organolithium compounds include methyllithium, isopropyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4 - dilithiobenzene, 1,5-dilithionaphthalene, 1,2-dilithio - 1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20 - tetralithioeicosane, 1,2,3,5-tetralithiocyclohexane, 1,2,3,5-tetralithio-4-hexylanthracene and the like. A full and complete disclosure or polymerizing monomers with lithium-containing catalysts is found in copending application Ser. No. 218,853, filed Aug. 23, 1962. A full and complete disclosure of the polymerization of conjugated diene and conjugated dienes with 1-olefins in solution and in the presence of organolithium catalysts is found in copending application Ser. No. 721,293, filed Mar. 13, 1958.

Generally, any catalyst inactivating or shortstop agent can be employed in this invention, suitable agents of which include such materials as hydroquinone, pyrrogallol, catechol, aniline, quinoline, fatty acids such as stearic acid and, preferably, rosin acid. Although less desirable, volatile materials such as water, alcohols and the like can be employed as shortstop agents.

It should be noted that along with the shortstop, other additives can be incorporated in the polymer product of the invention. Such additives include antioxidants, extender oils, carbon black or other pigment, or any other desired ingredient. Suitable antioxidants include N-isopropyl - N'-phenyl-p-phenylenediamine, methylene-2,2'-bis(4-methyl-6-tert-butylphenol), and other similar materials.

As mentioned before, this invention relates to solution polymerization and is therefore carried out in the presence of a hydrocarbon solvent. The solvent can be at least one material selected from the group consisting of aromatic hydrocarbons, paraffins and cycloparaffins and is preferably hydrocarbons of these types containing from 3 to 12 carbon atoms per molecule. Examples of such solvents include propane, n-butane, isobutane, n-pentane, isopentane, n-hexane, isooctane, cyclopentane, cyclohexane, methylcyclohexane, benzene, toluene, xylene, naphthalene and the like.

It should be noted that the conditions for the polymerization reactions of this invention are known in the art and will vary to a large degree depending upon the monomer, solvent and the catalyst being employed. A full and complete disclosure of polymerizing conditions is found in the above-mentioned copending application, Ser. No. 218,853 and 721,293.

Example

As an example of the application of this invention to batch polymerization, into a 3000-gallon reactor 2 is charged a 2000-gallon mixture of normal solvent and 1,3-butadiene monomer, consisting of 350 gallons (1820 pounds of butadiene and 1650 gallons (9070 pounds) of hexane, the solvent-to-monomer weight ratio being 4.98 to 1. To the stirred mixture, which is at a temperature of about 150° F. and a vapor pressure of about 31 p.s.i.a., is added about 0.07 p.h.m. (about 1.27 pounds) of n-butyllithium, and initiation of the polymerization reaction takes place shortly thereafter.

Temperature recorder controller 11, being instructed by its set point of 285° F. to achieve and thereafter maintain this temperature to the end of the polymerization, causes valve 10 to be closed thereby preventing cooling by coil 6 during this initial phase of the polymerization. Thus, the initial reaction is adiabatic with the temperature of the reactor contents increasing steadily toward 285° F. as polymerization heat is liberated and absorbed by the reacting solution as specific heat. The pressure within the reactor also rises since it is the vapor pressure of the reacting solution; however, the rate of pressure rise is tempered by the depletion of the butadiene concentration due to its being reacted to polymer. At the time that the reactor's temperature slightly exceeds 285° F., valve 10 is opened to allow coolant water to flow into coil 6 at a temperature of about 110° F. and to leave coil 6 at a temperature in the range of 130 to 200° F. The exit temperature of the water from coil 6 results from the combined effects of several heat exchange variables, namely the heat transfer coefficients, the surface area available, the coolant rate of flow and a differential temperature, such as the log mean differential temperature.

Polymerization is maintained and continued at 285° F. to near-complete conversion of monomer to polymer, of about 95 percent conversion. This "end-point" of the polymerization is detected by reactor solution specific gravity measurement performed by transmitter 23 which is provided with a gamma ray absorption density meter which is in turn provided with a reactor solution sample by loop 21. When the measured specific gravity (24) increases to a value of 0.586 (the set point of density controller 25) pump 27 is activated by signal line 26 to discharge the reactor contents to the polymer recovery operations 31. Rosin acid is added to the reactor contents by 30 in the amount of about 20 pounds to deactivate the active n-butyllithium present.

By the above, about 1780 pounds of polybutadiene at a concentration of about 16.35 weight percent is recovered by solvent and monomer removal operation 31.

Reasonable variations and modifications of this invention can be made, or followed, in view of the foregoing, without departing from the spirit or scope thereof.

We claim:

1. A solution polymerization method comprising maintaining a substantially liquid mixture of at least one monomer selected from the group consisting of a conjugated diene and mixtures thereof with 1-olefins having from 2 to 9 carbon atoms per molecule, a hydrocarbon solvent and an organo lithium catalyst in a lower portion of a reacting zone and under polymerization conditions which produce polymer and vapors of at least one of solvent and monomer, carrying out said polymerization until said polymer concentration is from about 15 to about 25 weight percent, maintaining said polymer in solution, agitating said substantially liquid mixture in said reacting zone, condensing said vapors in an upper portion of said reacting zone by contacting said vapors with a cool heat transfer surface, said upper portion being in free and direct communication with said lower portion, varying the temperature of said cool heat transfer surface in response to temperature variations in said reacting zone, returning said condensed vapors directly to said substantially liquid mixture, maintaining all vapors within said reaction zone, removing from said reacting polymer zone only polymer, substantially liquid monomer and substantially liquid solvent, and recovering polymer therefrom.

2. The method of claim 1 wherein liquid droplets entrained in said vapors are removed therefrom prior to contacting of said vapors with said cool heat transfer surface.

3. The method of claim 1 wherein said conjugated diene monomer has from 4 to 6 carbon atoms per molecule.

4. The method of claim 1 wherein the organolithium is represented by the formula $RLi_x$ wherein R is a hydrocarbon radical selected from the group consisting of aliphatic, cycloaliphatic and aromatic radicals, $x$ is an integer from 1 to 4, inclusive, and R contains 1 to 20, inclusive, carbon atoms.

5. A method of solution polymerization comprising maintaining a substantially liquid mixture of butadiene, a hydrocarbon solvent and an organolithium catalyst in a lower portion of a reacting zone and under polymerization conditions which produce at least a vapor of butadiene, carrying out said polymerization until the polymer concentration is from 15 to 25 weight percent, maintaining said polymer in solution, agitating said substantially liquid mixture in said reacting zone during said reaction, condensing said vapor in an upper portion of said reacting zone by contacting same with a cool heat transfer surface, said upper portion being in open communication with said lower portion, varying the temperature of said cool heat transfer surface in response to temperature variations in said reacting zone in the area of said mixture, returning said condensed vapors directly from said cool heat transfer surface directly into said substantially liquid mixture, maintaining all vapors within said reacting zone, removing from said reacting zone only a mixture of polybutadiene, substantially liquid unreacted butadiene and substantially liquid hydrocarbon solvent, and recovering therefrom polybutadiene as a product of the process.

6. The method of claim 5 wherein polymer droplets are removed from said vapor prior to contacting of same with said cool heat transfer surface.

7. A method of solution polymerizing comprising maintaining a substantially liquid mixture of butadiene, styrene, a hydrocarbon solvent and an organolithium catalyst in a lower portion of a reacting zone and under polymerization conditions which produce a copolymer of butadiene and styrene and at least a vapor of butadiene, carrying out said polymerization until the polymer concentration is from 15 to 25 weight percent, maintaining said polymer in solution, agitating said substantially liquid mixture in said reacting zone during the reaction, condensing said vapor in an upper portion of said reacting zone by contacting said vapor with a cool heat transfer surface, said upper portion being in open communication with said lower portion, varying the temperature of said cool heat transfer surface in response to temperature variations in said reacting zone in the area of said mixture in order to maintain a constant reaction temperature in said reacting zone, returning said condensed vapor directly into said substantially liquid mixture, maintaining all vapors within said reacting zone, removing from said reacting zone only butadiene-styrene copolymer, substantially liquid unreacted butadiene, substantially liquid unreacted styrene and substantially liquid solvent, and recovering the polymer therefrom.

8. The method of claim 7 wherein polymer droplets are removed from said vapor prior to contacting of same with said cool heat transfer surface.

References Cited

UNITED STATES PATENTS

| | | | |
|---|---|---|---|
| 3,300,458 | 1/1967 | Manyik et al. | 260—93.5 |
| 2,083,611 | 6/1937 | Marshall | 165—105 |
| 2,583,420 | 1/1952 | Garber et al. | 260—95 |
| 3,105,828 | 10/1963 | Porter | 260—94.2 |
| 3,135,716 | 6/1964 | Uraneck et al. | 260—93.5 |
| 3,279,533 | 10/1966 | Kersteter et al. | 165—105 |

JAMES A. SEIDLECK, Primary Examiner

U.S. Cl. X.R.

23—285; 165—105; 260—85, 94